Oct. 24, 1933.    H. R. C. ANTHONY    1,932,128
DRY BATTERY
Filed May 31, 1930    2 Sheets-Sheet 2
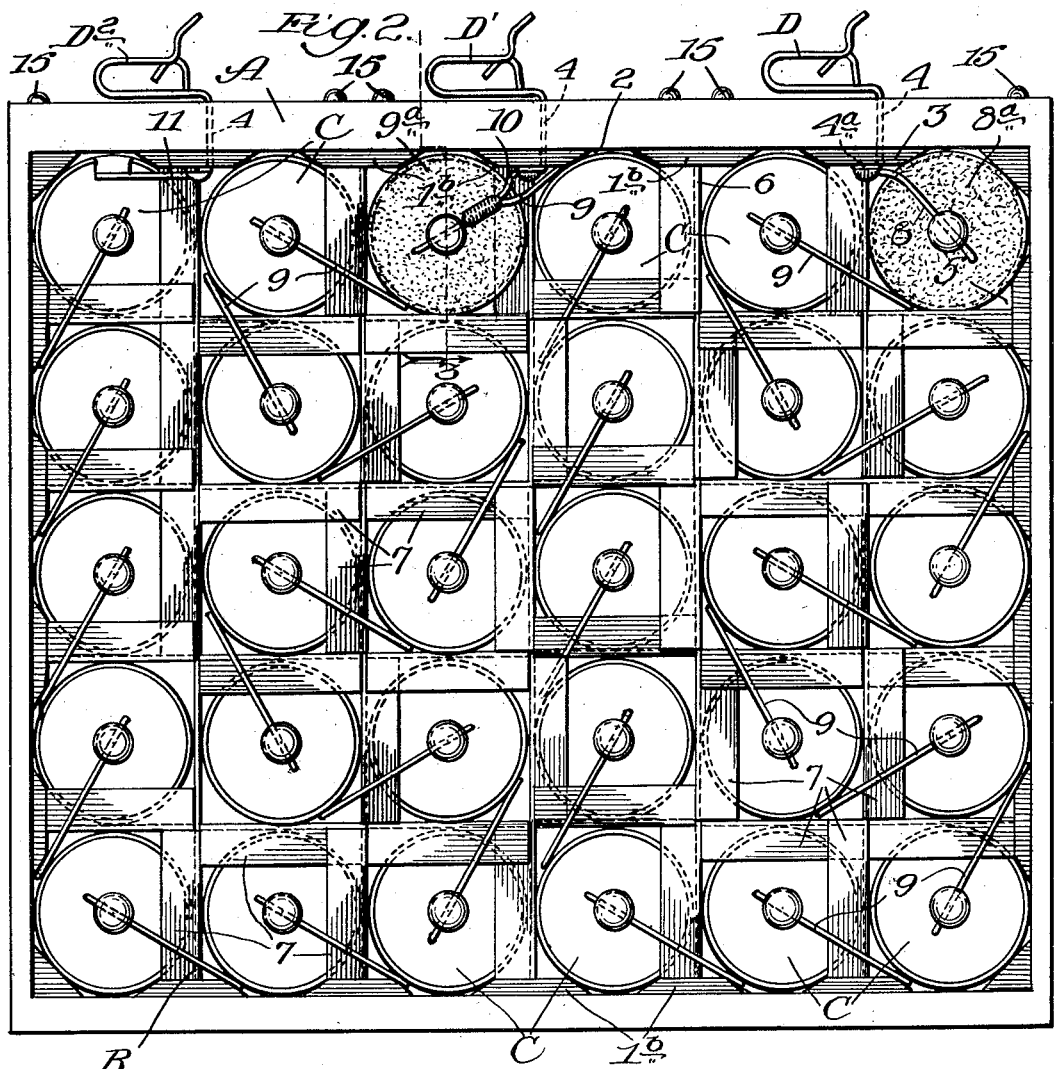
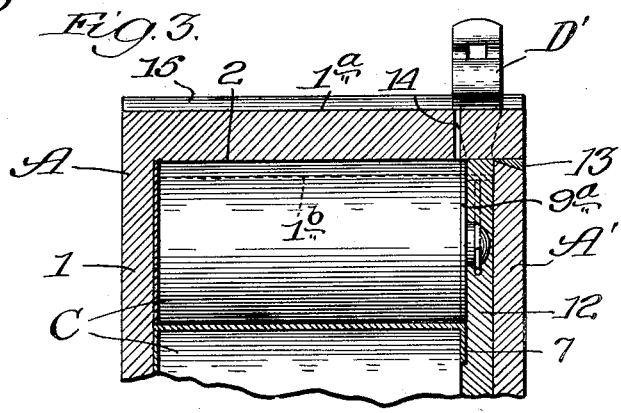
Inventor:
Herman R. C. Anthony,
By Dyrenforth, Lee, Chritton & Wiles,
Attys Patented Oct. 24, 1933

1,932,128

UNITED STATES PATENT OFFICE 1,932,128

DRY BATTERY

Herman R. C. Anthony, Blooming Grove, Wis., assignor to French Battery Company, Madison, Wis., a corporation of Wisconsin Application May 31, 1930. Serial No. 458,430

4 Claims. (Cl. 136—108)

This invention relates to dry batteries which are primarily intended for use as "B" or "C" batteries for radios; and the primary object is to provide an improved battery of the character mentioned and an improved method of manufacturing the same.

The accompanying drawings illustrate a battery of the type in which the terminals of the battery are located at the top of the casing, while the dry-cells are disposed horizontally within the casing. An important object of the present invention is to produce a battery of this type which is well adapted for use in connection with radios applied to motor vehicles, for example.

In the drawings—

Fig. 1 is a broken perspective view of a battery constructed in accordance with the invention; Fig. 2, a plan view showing the assembly before the casing has been closed and set on edge; and Fig. 3, a broken vertical sectional view, taken as indicated at line 3 of Fig. 2.

In the construction illustrated, A designates a casing having a closure-plate A' forming one sidewall; B an egg-crate cardboard structure introduced into the casing and forming compartments for dry-cells; C, dry-cells located within the compartments mentioned; and D, D' and $D^2$ terminals with which the battery is equipped.

The main body of the casing A consists of a sidewall 1 and a peripheral wall $1^a$ formed integrally therewith, thus forming an open-sided box. This box preferably is molded from a suitable compound, such as hard rubber compound.

In the molding operation, the peripheral walls of the box are provided at their inner sides with fillets $1^b$ having bevelled edges and affording between them recesses 2 into which the dry-cells of the marginal rows extend. The box is also provided in the molding operation with a recess 3, formed by cutting away the outer ends of the fillets $1^b$. The bottom of this recess affords a shoulder upon which the closure-plate A' may rest.

The battery terminals D, D' and $D^2$ preferably are molded in position. In the form shown, the terminals comprise spring clips of well-known construction. Each clip is provided with a shank 4 which extends through the portion of the peripheral wall $1^a$ which forms the top of the casing when the battery is in position for use, being molded into position in the operation of molding the casing. The shanks 4 extend through the corresponding fillets $1^b$ and have their inner extremities bent to extend parallel with the inner surfaces of the fillets, thus affording flanges $4^a$ adapted to be connected with the wiring of the dry-cells.

The egg-crate structure B may be formed of cardboard in any desired manner. If desired, the egg-crate structure may correspond with that shown in Meisekothen Patent 1,656,644 granted January 17, 1928.

The construction of the egg-crate structure is such as to provide cell-compartments 5 adapted to hold the dry-cells. It will be noted that the ends of the partition-walls 6 which form the egg-crate structure abut against the fillets $1^b$ of the casing which receives the egg-crate structure. Thus, the cell-compartments for the outer rows of dry-cells are formed partly by the cardboard walls, and partly by the peripheral wall of the casing, the recesses 2 serving to receive the outer portions of the marginal rows of dry-cells.

In the illustration given, the egg-crate structure is provided with cardboard tabs 7 which are folded over portions of ends of the dry-cells to provide insulating members.

One of the dry-cells has its central terminal connected by a wire 8 to the flange or lug $4^a$ of the terminal D. The cells are shown connected in series by means of wires 9. At an intermediate point in the series, the central contact of one of the cells is shown connected by a wire 10 with the central terminal D'. The wire 10 is shown soldered to one of the contacting wires 9. In effect, the two adjacent cells at this point are connected with the terminal D' which may thus serve either as a positive or as a negative terminal.

Preferably insulating discs or washers $8^a$ and $9^a$ are provided over the terminal cells to prevent the lead wires 8 and 9 from short circuiting to the zincs of those cells.

The zinc cup of the final cell of the series is connected by a wire 11 with the terminal $D^2$.

The assembly shown in Fig. 2 may be effected while the box rests upon the sidewall 1, which, during the assembly operation, constitutes the bottom of the box. After the dry-cells have been assembled in the box and connected with the terminals, a layer of pitch or sealing compound 12 preferably is poured over the tops of the cells. Some of the sealing compound enters the cell-compartments and anchors the dry-cells firmly in position.

To complete the battery, the closure-plate A' is introduced into the open side of the box, and is firmly secured in position. Preferably this is done by pouring molten sealing compound into a recess between the edge of the closure-plate and the peripheral wall of the casing, thus form- Oct. 24, 1933.  E. W. BARRETT  1,932,129
FILLING FEELER FOR LOOMS
Filed Aug. 15, 1932
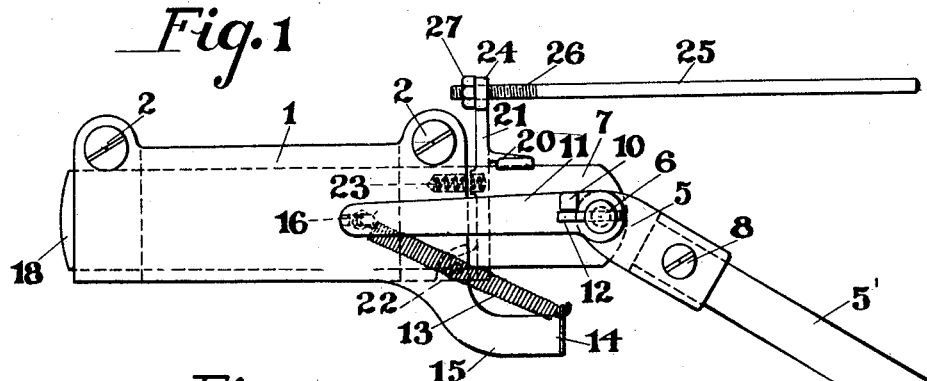
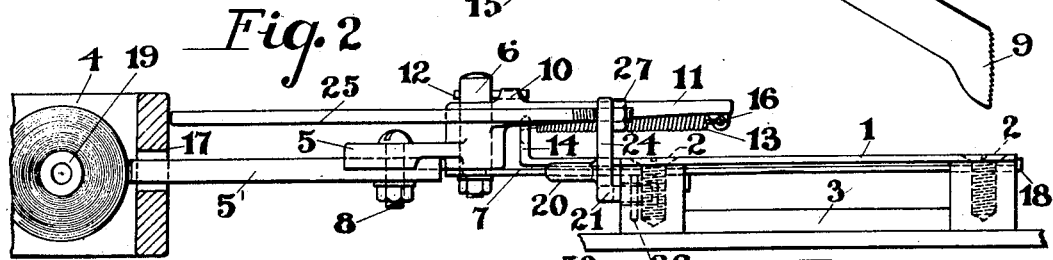
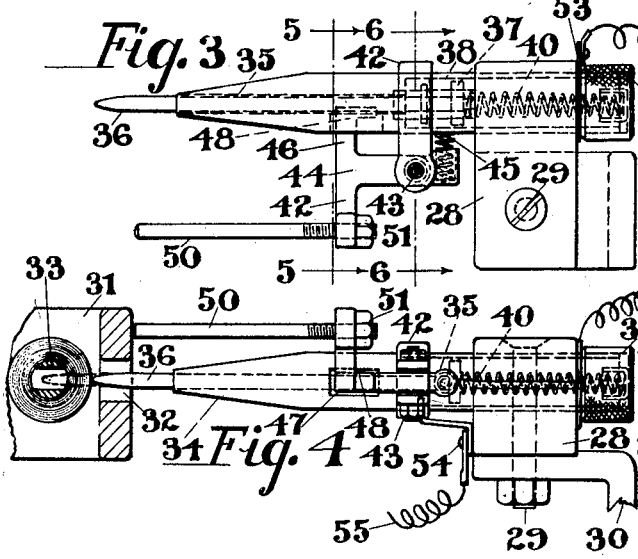
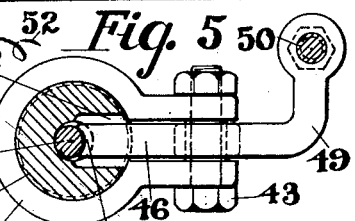
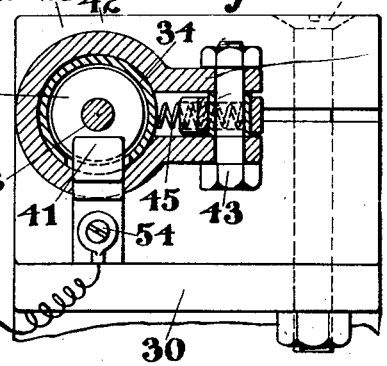
WITNESS
N. W. BRIDGHAM
INVENTOR.
EDWIN W. BARRETT
BY Claude F. Snider
ATTORNEY.